United States Patent [19]

Clemons et al.

[11] 4,157,982

[45] Jun. 12, 1979

[54] DISPERSED ROSIN

[75] Inventors: E. Dale Clemons, Clayton; John T. Daust, St. Louis, both of Mo.

[73] Assignee: Monsanto Company, St. Louis, Mo.

[21] Appl. No.: 598,970

[22] Filed: Jul. 24, 1975

Related U.S. Application Data

[63] Continuation-in-part of Ser. No. 386,242, Aug. 6, 1973, abandoned.

[51] Int. Cl.$^2$ .............................................. B01J 13/00
[52] U.S. Cl. ...................................... 252/311; 252/314
[58] Field of Search ............... 162/180; 252/310, 311, 252/314; 106/218, 238

[56] References Cited

U.S. PATENT DOCUMENTS

| | | | |
|---|---|---|---|
| 2,326,610 | 8/1943 | Borglin | 106/238 |
| 2,385,794 | 10/1945 | Chappell, Jr. | 106/238 |
| 2,393,179 | 1/1946 | Mashburn | 106/238 |
| 2,601,597 | 6/1952 | Daniel et al. | 162/180 |
| 2,771,464 | 11/1956 | Hastings et al. | 162/180 |
| 2,797,167 | 6/1957 | Kolodny | 106/238 |
| 3,582,464 | 6/1971 | Aldrich | 162/180 |

FOREIGN PATENT DOCUMENTS 424230  2/1935  United Kingdom ..................... 162/180

OTHER PUBLICATIONS

Schwartz, "Surface Act. Agents and Detergents", vol. II, (1958), p. 79.

*Primary Examiner*—Richard V. Fisher
*Assistant Examiner*—Peter Chin
*Attorney, Agent, or Firm*—R. Bruce Blance; William J. Farrington; James C. Logomasini

[57] ABSTRACT

A stable aqueous dispersion is prepared by emulsifying an immiscible mixture consisting essentially of molten rosin, alkali metal alkyl benzene sulfonate and water, said immiscible mixture having a temperature in the range of from about 165° C. to about 190° C., and cooling said emulsion. The product consists of a substantially stable aqueous dispersion consisting essentially of water, rosin material and alkali metal benzene sulfonate in an amount sufficient to stabilize the rosin material. Sized cellulosic substrates are prepared by mixing with an aqueous slurry of cellulosic papermaking fibers a sufficient amount of the aqueous dispersion described above to size the cellulosic paper fibers, forming the fibers into a web, and drying the web.

10 Claims, No Drawings

DISPERSED ROSIN

CROSS REFERENCES TO RELATED APPLICATIONS

This application is a continuation-in-part of application Ser. No. 386,242 filed Aug. 6, 1973 abandoned.

BACKGROUND OF THE INVENTION

This invention relates to aqueous dispersions of rosin and to methods of preparing such aqueous dispersions. It also relates to the use of such aqueous dispersions in the manufacture of sized paper products and to paper products sized with the dispersion of rosin.

Millions of pounds of rosin are used annually for internal sizing of paper. Internal sizing, sometimes referred to as "beater sizing" or "engine sizing" is the addition of certain chemicals to paper slurry prior to sheet formation to produce paper that has resistance to water and water systems. In general, sizing imparts three main properties to paper, i.e., water resistance, temporary wet strength and feathering resistance. As an example, paper for drinking cups is sized so that hot coffee, water and other beverages do not soak through the paper. Writing paper is sized, otherwise ink would "feather" and the writing would be difficult to read. Paper bags and other wrapping papers, such as paper used to wrap meat, are given temporary wet strength as well as to resist wetting.

The two important chemicals used in internal sizing are rosin and alum. Typically gum rosin, wood rosin and tall oil rosin are used in papermaking, and the art has developed processes tailored to produce suitable sizes from all three of these rosins. Rosin size is made by saponifying rosin with soda ash or caustic soda. The amount of caustic may be varied to give different amounts of free (unsaponified) rosin. The less free rosin, the easier the size is to emulsify. Too little caustic gives a size with high free rosin and sizes with little free rosin are more completely neutralized. Those skilled in the art stabilize sizes with very high free rosin by adding casein or alpha-protein to the rosin emulsion. Since both the rosin size and the cellulose fibers are negatively charged, they repel each other and sizing would be impossible without another agent to attract both the size and the fibers. When alum is added, the positively charged aluminum ions attract these negative materials. The cellulose fibers then become covered with tiny, discreet particles of aluminum rosinate, which after drying, are water repellant.

Many types of rosins and saponified rosins suitable for internal sizing are known to those skilled in the art. As an example, U.S. Pat. No. 2,393,179 discloses a rosin size dispersion in which practically all of the resin is present in free, i.e., unsaponified form, which is prepared by dispersing the free rosin with non-alkaline dispersing agents and stabilizing the dispersion so formed using a non-alkaline protective colloid. Typical non-alkaline dispersing agents include: sulfonated fat or oils, such as sulfonated castor oil, sulfonated stearin or neutral dispersing agents such as triethanol amine oleate, alkylaryl sulfonic acid salts, sulfonated higher fatty alcohols and the like. The protective colloid employed as stabilizing agents include neutral proteinaceous materials such as milk, casein, egg albumin and the like, although gum arabic, starch, water soluble methyl cellulose and the like may be employed.

U.S. Pat. No. 2,326,610 relates to oil in water emulsions wherein the dispersed phase comprises a substantial amount of free polymerized rosin. The polymerized rosin or blend may be emulsified by melting the polymerized rosin and bringing it into contact with a hot aqueous solution of a suitable alkali whereupon there is formed an alkali soap of polymerized rosin which acts as the emulsifying agent. Suitable emulsifying agents include any of the oil and water type, such as polymerized rosin, alkali soap, soaps of ordinary rosin, fatty acid alkali soap, sulfonated fatty glycerides, and the like.

U.S. Pat. No. 3,565,755 relates to rosins or fortified rosins prepared by preparing an essentially unstable, oil in water emulsion by mixing together water and the rosin or fortified rosins or salts thereof, and a solution of rosin base material dissolved in a water immiscible organic solvent. A stable oil in water emulsion is prepared by emulsification of the unstable emulsion and thereafter substantially all of the solvent is removed from the emulsion as by distillation to provide an aqueous suspension that is substantially homogeneous; and the saponified material, that is, the salt of rosin and/or salt of adduct reaction product serves as a dispersing agent in the aqueous suspension.

There are, however, certain attendant difficulties with either the manufacture or use of any of these sizing agents. Some of the prior art products will agglomerate in balls or lumps, causing the paper to stick to presses, dryers, felts, and the like, when the impregnated pulp is run out on a papermaking machine, or result in a mottled appearance of the sheet. Further, in many cases, coverage of the individual papermaking fibers may be poor, or in some cases, the precipitation of the rosin is incomplete and much of the material is lost in the white water. Although aqueous dispersion of a rosin, a fortified rosin, or a salt thereof that has been stabilized overcomes many of the above difficulties, such materials that are made by the use of a solvent have inherent difficulties such as the additional cost of manufacture to remove the solvent and the attendant fire hazards that are present during the preparation of the emulsion. These and other disadvantages of the prior art are overcome by the process of the present invention for preparing a stable aqueous dispersion of rosin, even containing substantially free rosin, that does not require the use of solvents during their preparation or the use of casein, alpha-protein or the like to stabilize the rosin.

SUMMARY OF THE INVENTION

It is one object of this invention to provide a process for preparing an emulsified rosin. It is another object to provide an emulsified rosin suitable for use in papermaking.

These and other objects are met in a process for preparing a stable aqueous dispersion comprising (1) emulsifying an immiscible mixture consisting essentially of molten rosin, alkali metal alkyl benzene sulfonate and water, said immiscible mixture having a temperature in the range of from about 160° to about 190° C., and (2) rapidly cooling said emulsion. By this process, a substantially stable aqueous dispersion is obtained consisting essentially of water, rosin material and an alkali metal alkyl benzene sulfonate in an amount sufficient to stabilize the rosin material. Sized cellulosic substrates may be prepared by a method which comprises applying to a web of a preformed cellulose substrate a surface sizing amount of the aqueous dispersion described above and drying said web. By such a papermaking process, there is obtained a sized cellulosic product having applied to the cellulosic fibers a stable aqueous dispersion consisting essentially of water, rosin material and an alkali metal alkyl benzene sulfonate as a stabilizer for the rosin material.

The rosin materials useful in the process of the present invention to make the aqueous dispersion of this invention are those that are known to the art. The term "rosin material" as used herein includes abietic acid, in substantially pure form, and any of the usual types of rosin, such as wood rosin, gum rosin and tall oil rosin in crude or refined state. The term "rosin material" also includes disproportionated rosin, partially or subsequently completely hydrogenated rosin, polymerized rosin, modified rosin, fortified rosin, or mixtures thereof. For the purposes of this invention the term "cellulosic substrates" includes paper and paperboard. Paper includes all materials which are encompassed within the ordinary and usual meaning of the word, including cellulosic and other vegetable fibers formed into thin felts or nonwoven sheets. Paper can be made from unbleached kraft, ground wood, unbleached sulfite, bleached kraft, bleached sulfite, rag, and the like.

As is known to those skilled in the art, rosins can be fortified by reacting or mixing the rosin with varying amounts of maleic anhydride, maleic acid, fumaric acid, and the like. Generally, maleic acid, maleic anhydride or fumaric acid are adducted in an amount of about 1 to about 20%, preferably about 4 to about 12% by weight, based on the weight of the rosin. A modified rosin is prepared by reacting or mixing the rosin with an aldehyde such as formaldehyde in an amount of from about 1 to about 3% by weight, based on the weight of the rosin. As an example, a formaldehyde modified and fumaric fortified tall oil rosin contains about 70% by weight of tall oil rosin and 30% by weight of an adduct of fumaric acid and tall oil rosin. Tall oil rosin is preferred and such modified and/or fortified tall oil rosins are especially preferred in the process of the present invention.

The selection of the material to act as a stabilizer for the rosin material is critical to prepare the aqueous dispersion according to the process of the present invention. It has been found that alkali metal alkyl benzene sulfonates known to the art, having a chain length between about 8 and about 24 carbon atoms in the alkyl chain are satisfactory. Alkali metal alkyl benzene sulfonates having an alkyl chain length of less than about 8 carbon atoms do not provide satisfactory dispersions by the process of the present invention and those alkali metal alkyl benzene sulfonates having a chain length of greater than about 24 carbon atoms are unsatisfactory since such alkali metal alkyl benzene sulfonates are generally not as soluble in water as those having lower chain lengths. Alkali metal alkyl benzene sulfonates having an average chain length of between about 12 and about 14 carbon atoms are preferred. As is known in the art, the alkyl portion of commercially available alkyl benzene sulfonates is a mixture of homologs differing by chain length. It is preferred to use an alkyl benzene sulfonate having an average linear alkyl chain length of 12 to 14 carbon atoms with more than 70% of the alkyl mixture being a $C_{13}$ or $C_{14}$ alkyl chain in the alkyl benzene sulfonate. Although the alkali metal alkyl benzene sulfonate includes the lithium, sodium, potassium and, for purposes of this invention, ammonium salts of the alkyl benzene sulfonate, the sodium salt is preferred.

A number of other surfactants were evaluated as dispersants in the process of the present invention such as sodium laurel sulfate, disodium-4-dodecylated oxybenzene sulfonate, sodium isostearate, and the like. Of the twenty-seven surfactants that were evaluated, it was found that the alkali metal alkyl benzene sulfonate was the only surfactant that provided a stable emulsion by the process of the present invention, and that the emulsion was not stabilized when using other surfactants. Indeed, it has been found that the sizing efficiency of the resulting rosin emulsion made with other surfactants was at times degraded compared to a rosin emulsified and stabilized with the alkali metal alkyl benzene sulfonate according to the process of the present invention, and therefore, it is preferred to avoid the presence of other surfactants when preparing the aqueous dispersions by the process of the present invention.

The continuous phase of the aqueous dispersion of this invention is water and it is preferred that the water be deionized to achieve a conductivity of less than 10 micromhos per millimeter.

The stable aqueous dispersions of the present invention are made by a novel process. Broadly described, the novel method involves emulsifying an immiscible mixture of water and molten rosin material. The alkali metal alkyl benzene sulfonate can be introduced in an amount sufficient to stabilize the emulsion into the immiscible mixture of water and molten rosin either before or after the emulsification step. On the other hand, the alkali metal alkyl benzene sulfonate can be added as a water solution to the molten rosin before the emulsification step, and this is the preferred step. Thereafter, the aqueous emulsion is rapidly cooled to provide the novel dispersions of this invention.

The ratio of the materials to prepare the stable aqueous dispersion of the present invention can vary within rather wide limits. The rosin material can be present in an amount of from about 1 to about 60%, preferably from about 30 to about 45% by weight, based on the total weight of the dispersion. Water can be present in an amount from about 99% to about 40%, preferably from about 70% to about 55% by weight, based on the weight of the dispersion. The alkali metal alkyl benzene sulfonate is present in sufficient amount to stabilize the rosin material to provide the stable aqueous dispersion of the present invention. Although the alkali metal alkyl benzene sulfonate can be used in amounts in excess of the stabilizing amount, it has been found that excessive amounts of the alkali metal alkyl benzene sulfonate detracts from sizing efficiency. Generally, the alkali metal alkyl benzene sulfonate is present in an amount of from about 1% to about 6%, preferably from about 1% to about 3% by weight, based on the weight of the rosin material.

In the emulsification, the immiscible mixture of water and molten rosin can be emulsified by any number of techniques known to those skilled in the art; such as using a homogenizer and the like. Highly satisfactory results have been obtained in the process of this invention by passing the immiscible mixture of water and molten rosin through a homogenizer at a pressure of from about 70 to about 315 kilograms per square centimeter. It is necessary that the temperature of the mixture during the emulsification step is sufficiently high to maintain the rosin material molten and free flowing to permit pumping, say from about 160° C. to about 190° C., preferably from about 165° C. to about 185° C., but not so high as to cause thermal decomposition of the materials.

It is critical in the process of the present invention that the aqueous emulsion containing water, molten rosin and the alkali metal alkyl benzene sulfonate is rapidly cooled. If the aqueous emulsion is not cooled with sufficient rapidity, solid rosin will precipitate out as a material having a consistency of wet chalk that is very difficult to handle. Although the immiscible mixture of water, molten rosin and alkali metal alkyl benzene sulfonate may be cooled by any number of means known to those skilled in the art, it will be obvious that the rate of cooling to avoid the formation of precipitated rosin will be dependent upon such factors as equipment configurations, the concentration of the rosin and the type of rosin used. It has been found that the use of a quench loop, which comprises passing the emulsified mixture of water, molten rosin and alkali metal alkyl benzene sulfonate through a heat exchanger under pressure sufficiently high to prevent flashing, provides satisfactory results. Satisfactory results are obtained when the emulsified product is cooled from a temperature between about 160° C. and about 190° C. to a temperature of about 100° C. or less within a time period of about 3 minutes, and preferably a shorter time period.

The particle size of the rosin material in the stable aqueous dispersion of the present invention made by the novel process described herein varies from about 0.03 microns to about 4 microns. Preferably, the average particle size of the rosin material is from about 0.15 microns to about 0.2 microns. Although the dispersions have a pH of from about 2 to about 4, very little of the rosin is saponified by the novel process of the present invention. The pH of the stable aqueous dispersion of the present invention can be readily adjusted for use in the papermaking process. The stable aqueous dispersions of this invention are stable for extended periods of time, i.e., at least six months. Thus, it will be obvious to those skilled in the art of making paper that an improved paper product can be obtained when the cellulosic fibers are covered with tiny, discreet particles of the rosin that can be uniformly distributed over the cellulosic fibers.

While the stable aqueous dispersions of the present invention can be used as a surface sizing agent for cellulosic substrates, or as an internal sizing agent by methods known to the art, it will be clear that they are particularly advantageous when utilized as an internal sizing agent. When the stable aqueous dispersion is utilized as a surface sizing agent, the aqueous dispersion is applied in the conventional manner, as by spraying, dipping and the like, to a preformed web of cellulosic substrate. The web is then subsequently dried. When utilized as an internal sizing agent, the aqueous dispersion of the present invention is added to an aqueous suspension of papermaking fibers at any point prior to web formation. It is preferred to add the aqueous dispersion of the present invention as close to the point of web formation as possible. On a papermaking machine, this would be at a point between and including the intake side of the fan pump and the headbox.

As will occur to those skilled in the art, the stable aqueous dispersion of the present invention can be added to the suspension of papermaking fibers at any convenient concentration which is dictated only by the rate of paper production, the method of metering and the concentration of the stable aqueous dispersion. Generally, the amount of aqueous dispersion used to size cellulosic substrates should be such that the cellulosic fibers absorb from about 0.05% to about 2% by weight of the rosin material, based on the weight of the dry fiber. However, as is known in the art, pulps vary in sizing value because of the wood used, the pulping process, the degree of pulping and bleaching and the extent of beating. Thus, more or less of the stable aqueous dispersion may be required to achieve satisfactory sizing.

As will occur to those skilled in the art, the stable aqueous dispersions of the present invention will be most efficient when used with a cationic retention aid and/or alum, at a pH of from about 4.0 to 9. The stable aqueous dispersion can be added to the pulp prior to the addition of alum or it can be added after the alum is added to obtain effective sizing. Other materials may also be used in the papermaking process such as alkali, various fillers, color and the like.

DESCRIPTION OF THE PREFERRED EMBODIMENTS

This invention is illustrated by but not limited to the following examples.

EXAMPLE I

Rosin material used in the preparation of the aqueous dispersion is first prepared by reacting tall oil rosin with formaldehyde and fumaric acid at elevated temperatures. The reaction product (hereinafter "rosin adduct") contains about 70% of free tall oil rosin and about 30% of adducted rosin. The acid number is about 235. The rosin adduct is then kept at a temperature of about 170° C. to keep the viscosity at a level that permits pumping but not at a level that can cause thermal decomposition.

A deionized water solution of sodium alkyl benzene sulfonate is prepared which contains 0.9% by weight sodium alkyl benzene sulfonate. The average chain length of the alkyl group is about $C_{13}$ and contains very little 2-phenyl isomer. The adduct is pumped into the soap solution to form an immiscible mixture. The temperature of the mixture is maintained at about 180° C. The mixture is then introduced into a single stage piston homogenizer and is homogenized at a pressure of about 189 to about 259 kg/cm$^2$. The hot emulsified product is then quickly introduced into a cooled quench loop. This loop consists of cooled emulsified product pumped through a heat exchanger. The pressure of the loop is sufficient to prevent flashing of the product as it exits from the homogenizer. The cooled product is withdrawn from the loop by a letdown valve controlled by the loop pressure.

By following the above procedure, a dispersion of rosin was obtained containing about 35% solids of which about 98% was rosin and rosin adduct and 1.7% was sodium alkyl benzene sulfonate. The balance of the dispersion was water. The aqueous dispersion had an average particle size of about 0.2 microns and a pH of about 3.

EXAMPLE II

Sizing is evaluated by making 2.5 gram sheets on a Noble and Wood handsheet paper machine. The furnish was 50:50 bleached hardwood and bleached Gatinean sulfite pulp, refined in a Mead laboratory refiner to about 450 Canadian Standard Freeness units. The furnish is then diluted to a 2% pulp consistency. Each of the following is added to the pulp with good agitation to provide 2% aluminum sulfate (alum), 0.05% of a cationic retention aid and 0.4% of the aqueous dispersion of Example I. The pH is adjusted to 4.5 while stirring for about ten minutes. Handsheets are then made.

The above procedure was followed and the sheets were tested for sizing using conventional sizing tests. Sheets sized with a commercially available paste rosin size were also tested. Results are given in the following table.

TABLE I

| Size | Application Level % | Ink Float Penetration Seconds | Surface Energy dynes/cm | Water Pick-Up mg/g |
| --- | --- | --- | --- | --- |
| Commercially Available Paste Rosin Size | 0.4 | 44 | 41 | 408 |
| Aqueous Dispersion of Example I | 0.4 | 117 | 37 | 330 |

Thus, in accordance with this invention there are provided novel aqueous dispersions of rosin material which are adapted particularly for use in manufacture of paper by internal sizing techniques. The aqueous dispersions of this invention are stable for long periods of time.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process which comprises emulsifying an immiscible mixture consisting of molten rosin, alkali metal alkyl benzene sulfonate and water while maintaining the mixture at a temperature above the temperature of the molten rosin; and thereafter cooling the emulsion to a temperature below about 100° C. at a rate sufficiently rapid to prevent precipitation of the solid rosin from the emulsion.

2. A process of claim 1 wherein water is present in an amount of from about 70% to about 55% by weight, and rosin material is present in an amount of from about 30 to about 45% by weight, based on the total weight of the dispersion.

3. A process of claim 1 wherein the alkyl group on the alkali metal alkyl benzene sulfonate has a chain length between about 8 and about 24 carbon atoms.

4. A process of claim 2 wherein the alkali metal alkyl benzene sulfonate is present in an amount from about 1% by weight to about 6% by weight, based on the weight of the rosin material.

5. A process of claim 2 wherein the alkali metal alkyl benzene sulfonate is the sodium salt and is present in an amount from about 1% by weight to about 3% by weight, based on the weight of the rosin material.

6. A process of claim 1 wherein the emulsion consists of (a) from about 99% by weight to about 40% by weight water, based on the total weight of the emulsion; (b) from about 1% by weight to about 60% by weight rosin material, based on the total weight of the emulsion; and (c) a stabilizing amount of alkali metal alkyl benzene sulfonate.

7. A process of claim 1 wherein the rosin material is a fortified and modified rosin, the alkali metal alkyl benzene sulfonate is sodium alkyl benzene sulfonate present in an amount from about 1% by weight to about 3% by weight, based on the weight of the fortified and modified rosin, and more than 70% of the total alkyl chain length being from 12 to 14 carbon atoms.

8. A process of claim 1 wherein the alkali metal alkyl benzene sulfonate has an average linear alkyl chain length of 12 to 14 carbon atoms.

9. A process of claim 6 wherein the alkali metal alkyl benzene sulfonate is present in an amount from about 1% by weight to about 6% by weight, based on the weight of the rosin material.

10. A process of claim 6 wherein water is present in an amount of from about 70% to about 55% by weight and rosin material is present in an amount of from about 30 to about 45% by weight, based on the total weight of the emulsion.

* * * * *